(No Model.) 3 Sheets—Sheet 1.
C. E. BUZBY.
TESTING MACHINE.
No. 534,994. Patented Mar. 5, 1895.
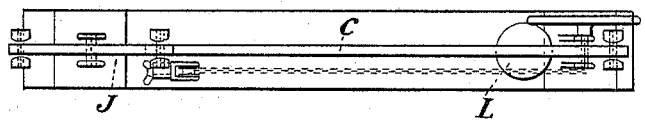
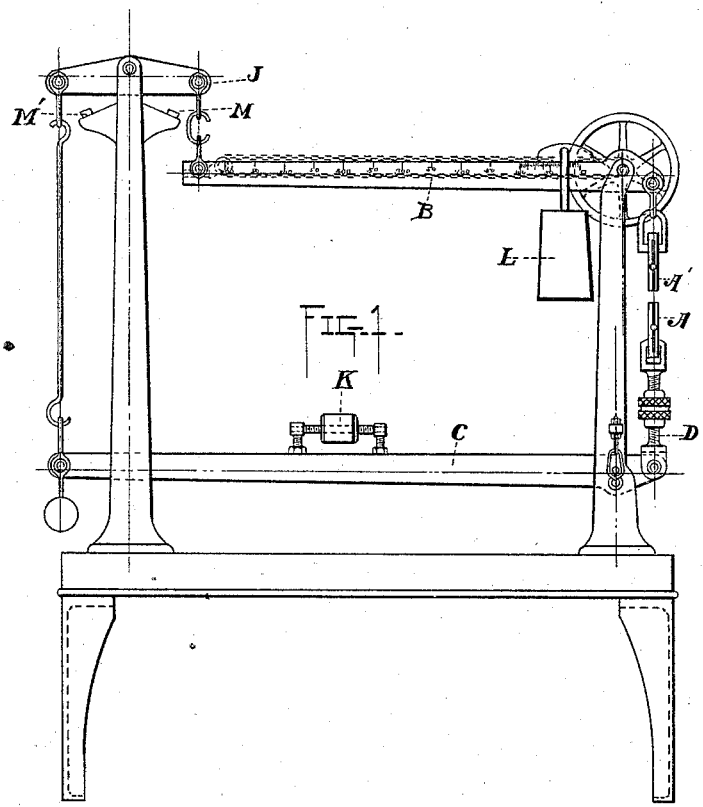
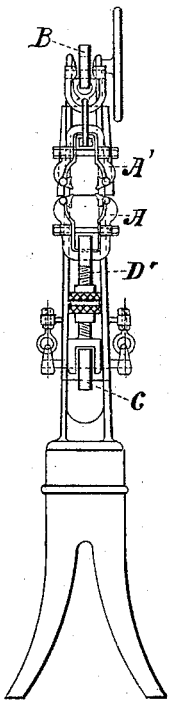
WITNESSES:
INVENTOR
Chas. Ernest Buzby (No Model.) 3 Sheets—Sheet 2.
C. E. BUZBY.
TESTING MACHINE.
No. 534,994. Patented Mar. 5, 1895.
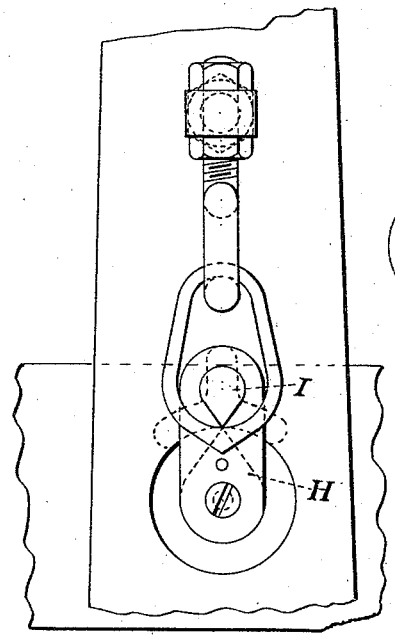
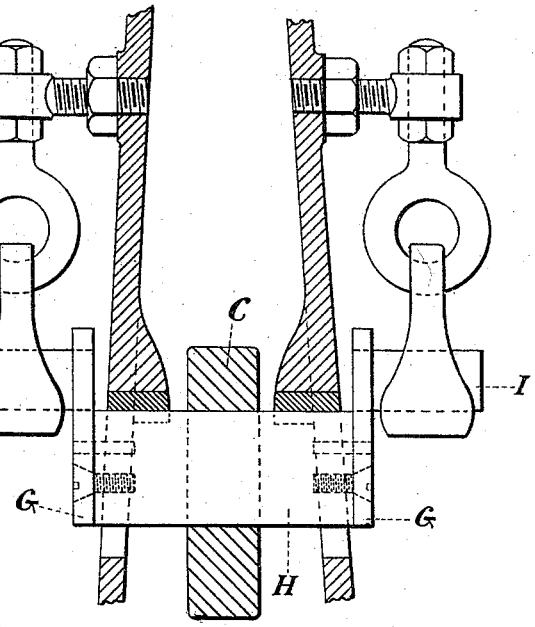
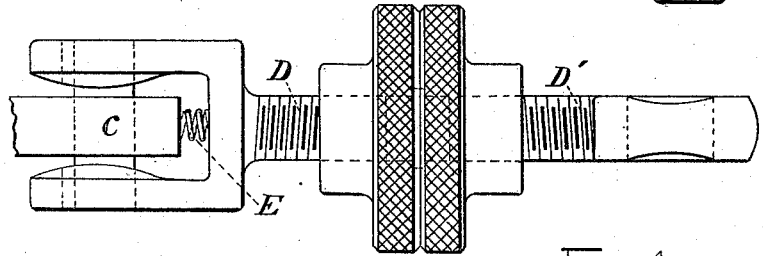
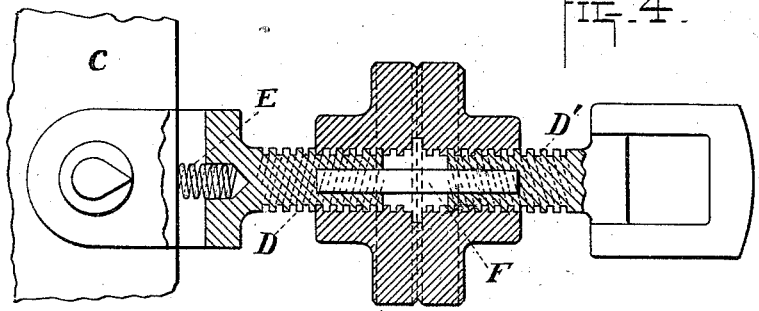
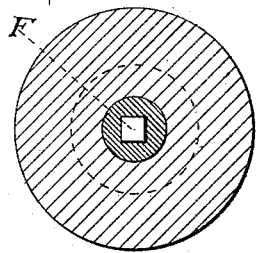
WITNESSES:
INVENTOR
Chas. Ernest Buzby (No Model.) 3 Sheets—Sheet 3.
C. E. BUZBY.
TESTING MACHINE.
No. 534,994. Patented Mar. 5, 1895.
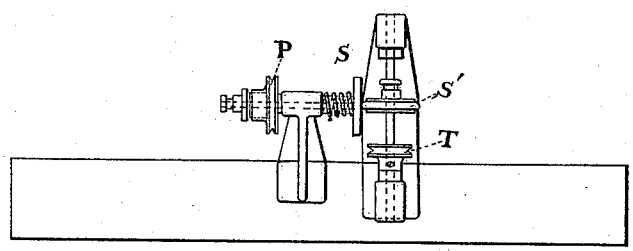
FIG. 11.
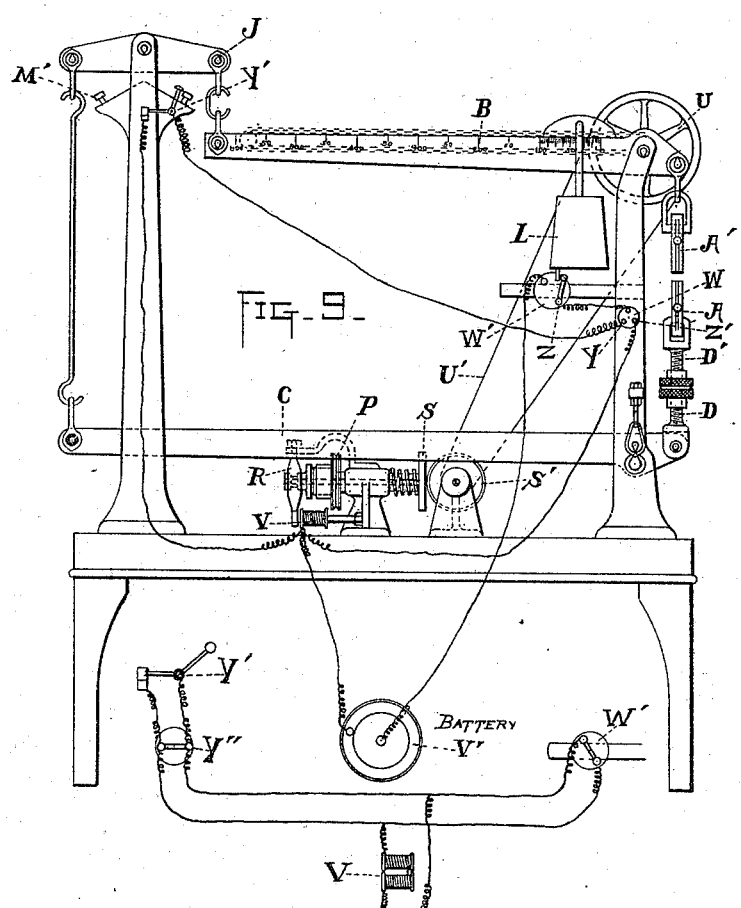
WITNESSES:
H. C. Cutler.
INVENTOR
Chas. Ernest Buzby

UNITED STATES PATENT OFFICE.

CHARLES ERNEST BUZBY, OF PHILADELPHIA, PENNSYLVANIA, ASSIGNOR TO FREDERICK A. RIEHLE, OF SAME PLACE.

TESTING-MACHINE.

SPECIFICATION forming part of Letters Patent No. 534,994, dated March 5, 1895.

Application filed July 5, 1894. Serial No. 516,671. (No model.)

*To all whom it may concern:*

Be it known that I, CHARLES ERNEST BUZBY, a citizen of the United States, residing at Philadelphia, in the county of Philadelphia and State of Pennsylvania, have invented certain new and useful Improvements in Testing-Machines, of which the following is a full, clear, concise, and exact description, reference being made to the accompanying drawings, forming a part of this specification.

My invention relates to an improved form of testing machine for testing the tensile strength of brittle or inextensible materials such as hydraulic cements, glass, or cast iron. It is the usual custom in machines of this nature to apply the power or tensile stress by means of a screw pulling at one end, and measuring the amount of this pull by a counterbalancing beam and poise at the other. My improvements relate to combining these movements in the single movement of the poise on the scale beam, so that the poise weight applies the load and measures it at one and the same time.

Another feature of the machine consists in combining its mechanism with that of Patent No. 521,331, just issued to me, for the purpose of causing the poise to travel and stop automatically to suit the stress and rupture of the test specimen. The manner of accomplishing this is illustrated in the accompanying drawings, in which—

Figure 1 represents a side elevation of the plain machine without automatic attachments. Fig. 2 is an end elevation, and Fig. 3 a top view of the same. Figs. 4, 5, and 6 are details of the adjusting screw, and Figs. 7 and 8 details of the method of supporting the lower lever at knife edge. Fig. 9 is a side elevation of machine with automatic attachments; Fig. 10, an end section, and Fig. 11 a top view of the automatic disks, brackets, &c., Fig. 12 being a representation of a simpler method of wiring than that illustrated in Fig. 9.

Like parts are represented by similar letters throughout the different figures.

Referring to Figs. 1, 2 and 9, A and A' are the cement grips or holders, the upper one being suspended from the upper graduated scale beam B and the lower supported on the lower lever C through the adjusting screw D D' which is itself sustained so as to bear against its knife edge by a delicate spring E, Figs. 4 and 6. The adjusting screw D D' is made in two parts with right and left threads and an adjusting nut to suit, the two sections of the screw being prevented from turning by the square central key shown at F, Fig. 5. The upper beam B is supported directly in the stand adjacent to the grip holders and the lower lever C is suspended from a fulcrum I and plate G fastened to the main pivot H, Figs. 7 and 8, and arranged so that the knife edges correspond and thus eliminate friction, the function of the pivot I being to support the lever in position and that of the main pivot H to resist the strain applied to the specimen.

The beam B and lever C are proportioned to exert the same leverage and their power is connected and applied to the specimen in opposite directions by means of the intermediate equal lever J, which transmits the load from one beam to the other in equal and opposite directions. There are check cushions at M and M' to prevent excessive motion of the equal lever J and to catch this lever at rupture of specimen.

The operation of the machine as shown in Fig. 1 is as follows: The beams are placed in balance by means of the balance ball K. The specimen is then inserted in the grips A A', and the screw D D' adjusted to take up the slack and give the equal lever J a slight elevation at end J'. The poise L is then propelled steadily forward with an even speed until its increasing stress distributed between the two beams or levers breaks the specimen, at which point the poise is stopped and the reading of the upper beam taken, the poise returned to zero, and all is ready for another test. The action of the equal opposite levers is to absorb the extension or settling of specimen in the grips, and as this is slight in hydraulic cement and like brittle materials it is readily taken up by the two levers, as each has only one half the movement, and the specimen breaks before the equal lever J reaches the check M.

When the automatic combination is used in connection with this machine, as shown in Figs. 9, 10, 11, and 12 and covered by Patent No. 521,331, the operation is as follows: The grooved wheel P is kept in constant revolution by means of belt to countershaft or a motor, and its motion is transferred to its shaft by means of the friction clutch and lever R, controlled by the action of the magnet V through the electric current generated by the battery V'.

The method of controlling the current is as follows: When the specimen is in position and the tension adjusted by the screw D D' the circuit is completed by connecting at switch W' which should have been kept open before. The three point switch W should be connected at Z Y. The circuit will then pass through the automatic trip at Y' and cause the magnet to act revolving the disk S which by the friction caused by the coil spring causes the disk S' to revolve with a velocity and direction due to its position on the disk S, this position being adjusted at the will of the operator by simply sliding on its shaft, in which a sliding key is fitted causing it to drive the small pulley T, which in turn communicates its motion by means of the endless belt U' to the handwheel pulley U which controls the movement of the poise by chain and sprocket wheel gearing. The disk S' having been adjusted to the proper speed, the poise travels automatically to the point of rupture, when the weight of the poise causes the equal lever J to break the circuit at trip Y' and stop instantly at the breaking load. The friction disk S' is then shifted to the opposite side to reverse the motion, the switch W is closed to Z Z' and the poise returns until a finger on the poise L strikes the lever of switch W' and breaks the circuit thus stopping automatically at zero.

A simpler form of wiring is shown at Fig. 12 where the switch Y" takes the place of three point switch W. In this case Y" is left open until rupture of the specimen. Then as the equal lever J holds the circuit broken at Y' it is necessary to close Y" in order to make poise run back, the switch W' being used to start up when ready to apply strain.

What I claim is—

1. In a testing machine the combination of the lever C working in conjunction with the graduated beam B by means of the equalizing lever J so as to make a uniform strain on a test specimen inserted in the grips A A'.

2. In a testing machine the combination of a single poise weight L propelled on a graduated beam B acting on beam B and by means of the connecting rods and clevises in equal and opposite direction also on lever C by means of equal lever J and its connections, making a uniform strain through the adjusting screw D D'— and grips A A'— on the specimens under test.

3. The combination of the beam B, lever C, equalizing lever J, and adjusting screw D D' with the automatic driving disks S S', magnet V, friction pulley P, and lever R for the purpose of propelling the poise automatically on the beam B, thus increasing and weighing the stress up to the point of rupture of specimens in the grips A A' substantially as described.

Dated June 25, 1894.

CHAS. ERNEST BUZBY.

Witnesses:
WM. C. CUTLER,
JNO. RATHBONE LONGSHAW.